June 23, 1964  G. E. HOWE  3,138,226
SELF-ALIGNING DEVICE
Filed Feb. 14, 1961  5 Sheets-Sheet 1

INVENTOR.
GEORGE E. HOWE
BY
*Rn. R. Schermerhorn*
ATTORNEY

June 23, 1964

G. E. HOWE 3,138,226

SELF-ALIGNING DEVICE

Filed Feb. 14, 1961

INVENTOR.
GEORGE E. HOWE
BY
*Lw R. Schermerhorn*
ATTORNEY

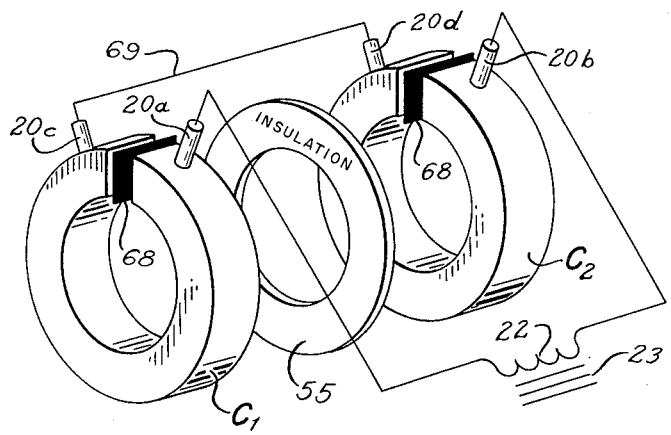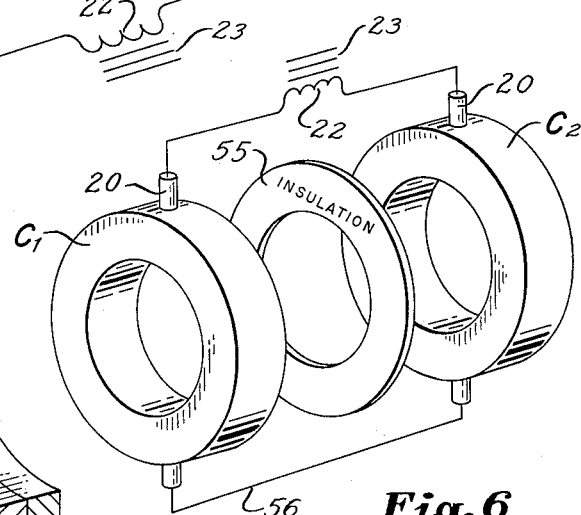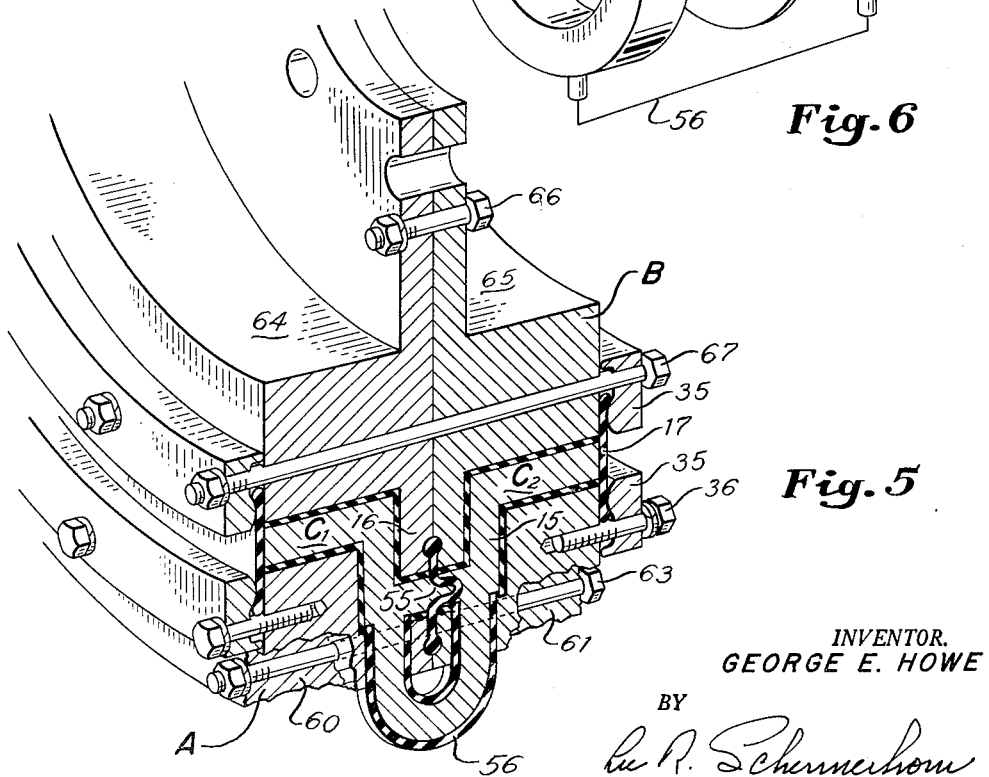

INVENTOR.
GEORGE E. HOWE

INVENTOR.
GEORGE E. HOWE
BY
ATTORNEY

3,138,226
SELF-ALIGNING DEVICE
George E. Howe, Pacoima, Calif., assignor to Guy F. Atkinson Company, South San Francisco, Calif., a corporation of Nevada
Filed Feb. 14, 1961, Ser. No. 89,301
3 Claims. (Cl. 189—36)

This invention relates to a device or fixture for connecting two structural parts together in adjustable relationship by means of a fusible material which is melted to allow adjustment of at least one of the parts and then frozen to form a rigid connection between the parts.

In connection with the inspection and maintenance of equipment, for example, it is often necessary to disconnect parts of a structure from time to time. This problem may arise in connection with ponderous equipment which must be handled by power operated mechanisms and it may arise also with any size of equipment exposed to dangerous radiation whereby, in either case, conventional fastenings and adjustments requiring human manipulation cannot be employed. Either of necessity or for convenience, it is desired to provide fastenings and adjustments for such purposes which can be operated and controlled from a near or remote station where the operator does not have physical contact with the parts themselves. The present invention is concerned with the adjustment, alignment and fastening phase of this problem.

Objects of the invention are to provide a self-aligning device for the purpose stated above, to provide a new method of adjustment of structural members, to provide a self-aligning fixture having up to six degrees of freedom as hereinafter defined, to provide a self-aligning fixture which may be made flexible or rigid in response to a signal from a near or remote control station, to provide a self-aligning cell containing a fusible material, to provide a self-aligning cell containing a fusible resistance material melted by an electric current passed through the fusible material, to provide forms of physical construction for such a cell which best utilize the mass of the fusible material for joint strength and for resistance heating, to provide cell configurations having current paths of appropriate length and cross section for large and small installations and different mechanical requirements, to provide cell configurations having multiple current paths through the fusible material and to provide novel auxiliary features and details to make the self-aligning cell effective and adaptable to different environmental conditions.

The invention is embodied in a fixture or cell having three major parts, two of which are capable of assuming six degrees of relative freedom in response to, and for the duration of, a signal from a near or remote station. One of the major parts fits loosely into a second major part wherein the clearance of the resulting joint is filled with a material, a third major part, which has a melting temperature lower than that of the first two major parts. The joint is flexible as long as the filling material is in a liquid state but becomes rigid when the filling material is in the solid state.

The fusible material may be melted by any suitable form of heating device but it is preferred to use a conductive fusible material which has appropriate electrical resistance so that this material will form its own heating element when an electric current is passed through the material between a pair of electrodes or other points of connection to an electric current source. Auxiliary cooling means may be provided for solidifying or freezing the material but in cases where the adjustment interval is brief and the heating of the material is rapid, the parts in thermal contact with the molten material will remain relatively cool and will abstract heat therefrom and freeze it quickly without any necessity for a special coolant system.

The provision of six degrees of freedom makes reference to the three mutually perpendicular axes of a body commonly referred to as the X, Y and Z axes. Three degrees of freedom are obtained by permitting rotation about each of these axes. Three more degrees of freedom are obtained by permitting movement in translation longitudinally along each axis. A portion of the first major part referred to above is confined loosely within a cavity of the second major part so as to be captive therein, preventing separation of the parts. This cavity forms a cell to contain the fusible material which constitutes the third major part. In the absence of a signal melting the fusible material and permitting the parts to assume their six degrees of relative freedom, the three major parts act together as a single rigid body. When the fusible material is melted, the first two major parts have freedom of relative movement within the clearance space in the cavity between the parts. The invention also covers applications where fewer degrees of freedom are provided and applications where certain degrees of freedom are provided by one fixture and other degrees of freedom are provided by another fixture.

The invention will be better understood and additional objects and advantages will become apparent from the following description of certain preferred embodiments illustrated in the accompanying drawings. Various changes may be made, however, in the construction and arrangement of parts and certain features may be used without others. All such modifications within the scope of the appended claims are included in the invention.

In the drawings:

FIGURE 5 is an enlarged fragmentary sectional view illustrating certain details of construction in FIGURE 4;

FIGURE 6 is a schematic diagram of the heating circuit in the modification shown in FIGURES 4 and 5;

FIGURE 7 is a diagram showing a different heating circuit;

Figure 1:
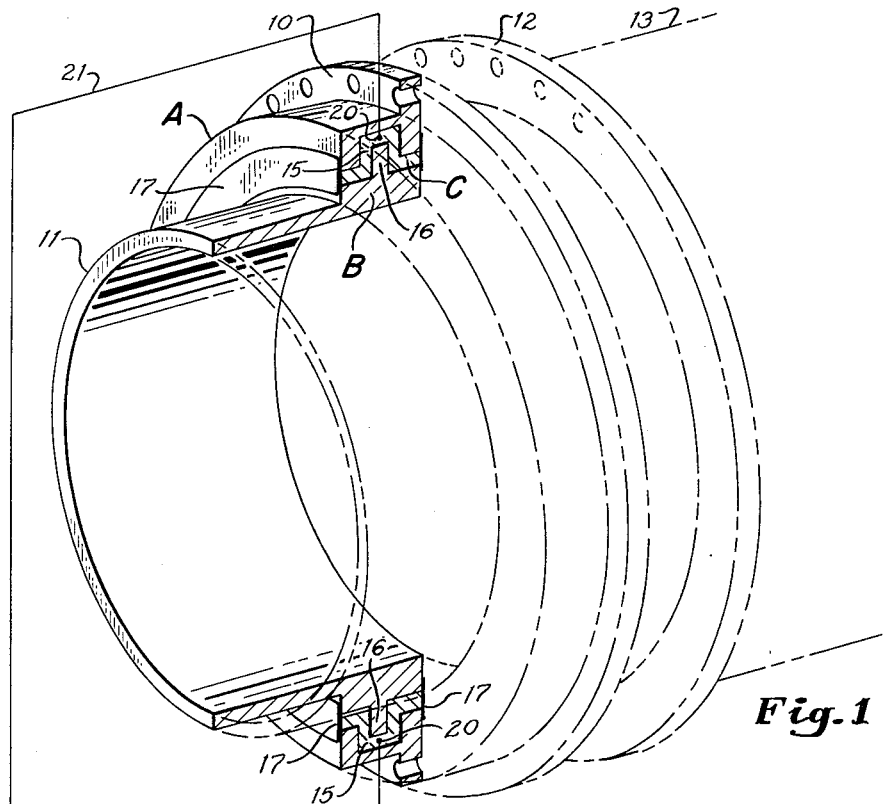
FIGURE 1 is a perspective view with parts broken away and other parts shown in phantom, illustrating the principles of the invention applied to a large diameter flange-type connection.

In FIGURE 1 the numeral 10 designates a mating flange carried by a structural member 11 of a movable assembly. Flange 10 is to be bolted to the flange 12 of a part, such as saddle flange member 13, which must be removed from a stationary assembly (not shown). In order to attach and transfer member 13 to the movable assembly, the flange 10 must be adjusted to the flange 12 so that the two flanges will lie flat against each other in coaxial relationship with their bolt holes in registry. The movable assembly represented by the member 11 is massive in size and weight and is movable toward and away from the stationary flange 12 by power operated mechanisms which are not capable of bringing the two flanges together in precise mating relationship for bolting together.

Thus, some additional means of adjustment must be provided to permit tilting of the flange 10 relative to member 11 in order to place the flange 10 in a plane parallel with the plane of flange 12 and to permit rotation of the flange 10 about its own axis to bring its bolt holes into angular alignment with the bolt holes of flange 12. Further, the flange 10 must be movable in translation in axial as well as horizontal and vertical transverse directions relative to member 11 in order to shift the bolt holes into registry and place the flanges into mating contact with each other. These various movements require three degrees of freedom in rotation about the X, Y and Z axes of support member 11 and three degrees of freedom in translation longitudinally of the X, Y and Z axes.

For the reverse operation, after the movable assembly 11 has replaced member 13 on its stationary assembly, the flanges 10 and 12 are disconnected and the movable assembly is removed. The next time member 13 is to be removed from its stationary assembly, some readjustment of flange 10 is necessary because of the aforementioned lack of precision in the movements of the power operated devices used for moving the member 11, and other factors. Thus, the self-aligning device connecting flange 10 with support member 11 must be capable of repeated operation each time the flanges 10 and 12 are to be connected together, but, after they have been connected, the self-aligning device must maintain a rigid connection between flange 10 and support member 11 in order to be able to replace member 13 back on its stationary assembly. The invention is of general application, however, and is not limited to the specific problem and environmental conditions just described as an illustrative example.

The present self-aligning device comprises a fixture having the three major parts A, B and C. The part A in this instance includes the mating flange 10. The part B is a support for the mating flange integral with the member 11, and the part C is a body of fusible material. Part A is a structural metal ring having an internal annular channel 15 forming a cell to contain the fusible material C. Loosely confined within this channel is a radial structural metal flange 16 on support B. Flange 16 is captive in the channel 15 and cannot be removed therefrom, except by major disassembly, but the clearance between flange 16 and the walls of channel 15 allow the required six degrees of freedom whereby part A can move to a limited extent in universal rocking motion, in axial movement and in transverse movement horizontally and vertically.

Fusible material C is confined in the cell thus formed by channel 15 by a pair of flexible containment diaphragms 17 interconnecting the parts A and B as shown. When the heating periods for the fusible material are not of excessively long duration, the flexible containment material 17 is preferably a silicone rubber. Other suitable materials are flexible insulated metal bellows or a bellows-type container made of glass cloth impregnated with a suitable plastic such as "Teflon."

A suitable fusible material C for the present purpose is a lead-bismuth metal alloy such as "Cerrotru." In order to increase the electrical resistance of the alloy, it may contain suitable non-conducting and inert material in suspension such as mineral powders, plastic powders or ceramic powders. When there is only light mechanical loading on the self-alignment fixture, the fusible material may comprise a plastic having sufficient conductivity to cause it to be softened and melted upon the passage of an electric current therethrough. In any case, the fusible material should have a low heat of fusion, adequate compressive strength for the purpose and a relatively low melting point.

Figure 2:
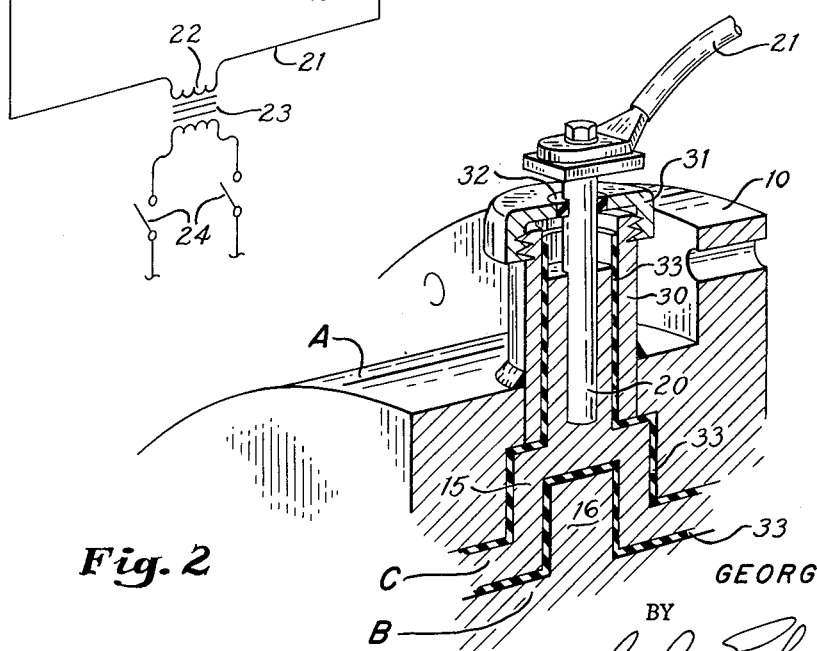
FIGURE 2 is an enlarged fragmentary view showing an electrode arrangement in the device of FIGURE 1.

The fusible material C is preferably melted by the heating effect of an electric current passed through the fusible material between a pair of electrodes 20. In FIGURE 1, the electrodes 20 are located in diametrically opposite sides of the channel 15 and are connected to wires 21 from the secondary winding 22 of a suitable transformer 23 such as a conventional welding transformer. The primary circuit of the transformer is controlled by a switch 24 which may be relay-actuated by a control signal from a near or remote station. The electrodes 20 are illustrated schematically in FIGURE 1. Reference will be made to FIGURE 2 for the physical structure of the electrodes.

No special cooling means is employed in FIGURE 1. When the heating period required to melt the fusible material and effect the adjustment of flange 10 into alignment and securement with flange 12 is not of long duration, the metal masses of the parts A and B do not assume a temperature approaching the temperature of the molten fusible material. The present heating circuit generates all its heat directly in the fusible material itself. Then, when the heating circuit is deenergized, all the metal masses in a thermal conducting relationship with the fusible material operate as a heat sink to abstract heat from the fusible material and freeze it with sufficient rapidity for the purpose. This heat sink includes not only the parts A and B themselves but also the adjacent metal parts 10, 11, 12 and 13, all of which rapidly conduct heat away from the molten material and dissipte the heat to the atmosphere.

FIGURE 2 illustrates a preferred form of electrode arrangement for FIGURE 1. Metal tube 30 provides a short standpipe connecting with channel 15 to hold a small reserve supply of the fusible material C. A screw cap 31 on this tube is equipped with an insulating bushing 32 to support the cylindrical electrode 20 in the center of the tube so that it will not interfere with the freedom of movement of flange 16 in the channel 15. All metal surfaces in contact with the fusible material are insulated as indicated at 33. This insulation may comprise a varnish, an impregnated cloth or a suitable plastic such as "Teflon" bonded to the metal surfaces.

When the axis of annular channel 15 is horizontal, as shown, one of the standpipe tubes 30 is preferably located at the highest point in the channel to prevent trapped air in the channel. Trapped air creates voids in the fusible material producing electrical discontinuities in the conductive path resulting in arcing conditions which may be destructive of the containment diaphragms 17.

Figure 3:
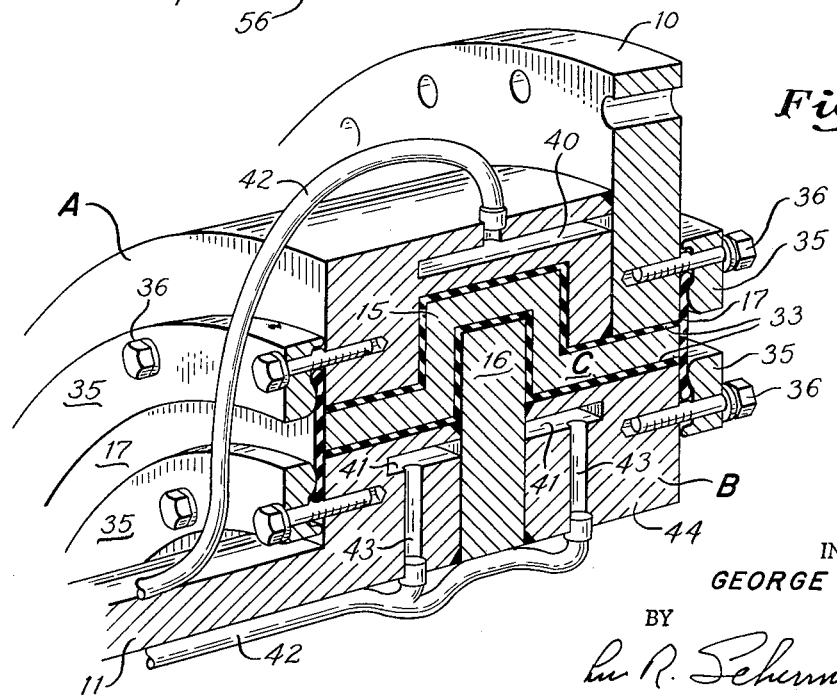
FIGURE 3 is a similar fragmentary sectional view showing further details of the FIGURE 1 device and including an additional feature as a modification.

FIGURE 3 shows one of the annular containment diaphragms 17 clamped by metal rings 35 against coplanar end surfaces of the parts A and B. The rings 35 are secured to these parts by screws 36. The other diaphragm 17 is similarly clamped to the part B and to a portion of an annular plate which forms the flange 10. This plate is welded to the part A and forms an integral extension thereof. When the diaphragms 17 are made of an elastic material such as rubber they may be disposed flat as shown, the elasticity of the material allowing the necessary movements of part A and flange 10 without impairing the freedom of movement.

The fastenings between flanges 10 and 12 in FIGURE 1 are self-centering and self-seeking in the flange holes and the robot devices which apply the fastenings in the present instance have sufficient power to stretch the rubber diaphragms to the extent necessary to obtain registry of the holes. When the diaphragms 17 are not made of elastic material, some extra fullness is provided by way of bellows folds to accommodate movement between the parts A and B. In any case, the diaphragms are constructed and arranged so as not to impair the adjustment of the flange 10 into mating engagement with its companion flange by whatever adjusting instrumentality may be used.

For some purposes the part A may be shaped to close the channel 15 on one side so that only one diaphragm 17 is then necessary to retain the fusible material C.

FIGURE 3 further includes a feature not shown in FIGURE 1, comprising coolant passages or channels 40 and 41 in the parts A and B. A suitable cooling fluid such as water is circulated through these passages by means of connecting tubes 42 during the freezing cycle of the fusible material. In order to facilitate fabrication of the parts A and B to include the passages 40 and 41, these parts may be built up from a series of rings as shown. Thus, the main body of part A may constitute one ring containing the annular channel 40, the open side of this channel being closed when the ring flange 10 is welded on. The part B then comprises one ring integral with the member 11 containing an annular channel 41 and connecting duct 43, a flange ring 16 and another ring 44 containing an annular channel 41 ad connecting duct 43. These rings are welded together as shown to make an integral support body containing the flange 16.

The passages or channels 40 and 41 in FIGURE 3 may also be utilized as heating means instead of the transformer 23 in FIGURE 1. For example, steam at 280° F. circulated through the channels 40 and 41 will melt fusible material and keep it molten while the joint is in adjustment. Then the fusible material may be frozen by turning off the steam supply and permitting heat loss to the atmosphere or by circulating cold water through the channels. Also, if desired, electric heating units may be inserted in channels 40 and 41, in which case some means of access for replacement or repair could be provided in an obvious manner. When the fusible material is thus indirectly heated by thermal conduction, it does not need to be electrically conductive and, of course in such case, the electrodes 20 in FIGURE 2 are not employed.

Figure 4:
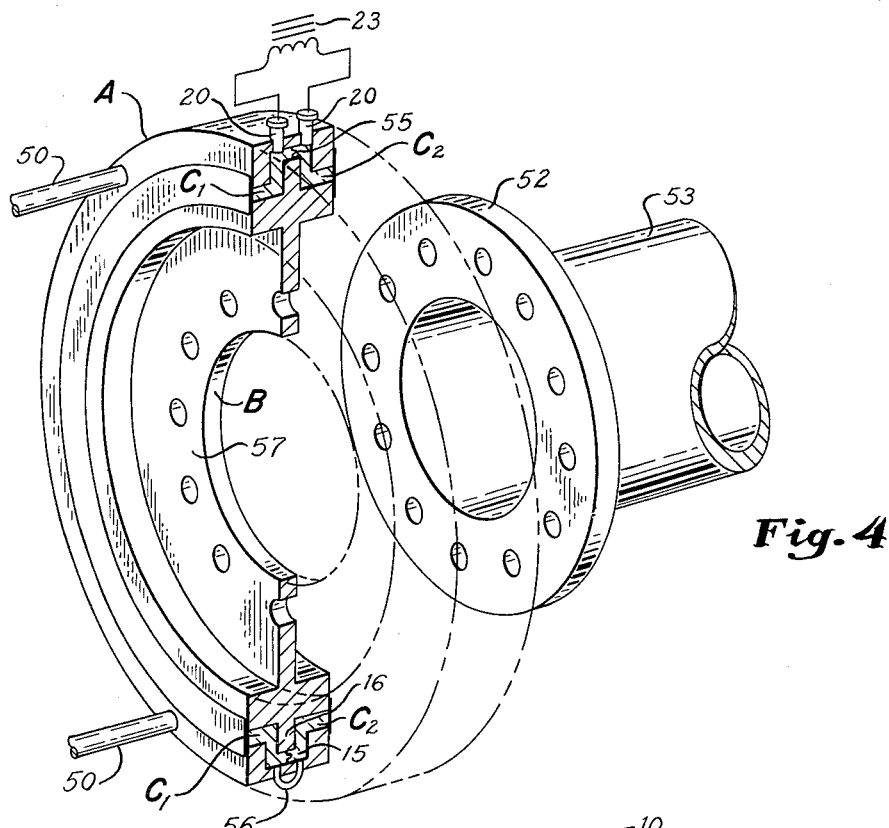
FIGURE 4 illustrates a modification suitable for a fixture of small diameter.

FIGURES 4, 5 and 6 show an electric circuit arrangement for melting the fusible material in a smaller size of alignment fixture. In this case the part A is carried by movable support means 50 and the part B is equipped with an inner mating flange 51 adapted to be connected to the bolting flange 52 on a stationary member 53. In order to lengthen the path of the electric current through the fusible material, the channel 15 is divided into two circular cells by an intermediate flexible insulating diaphragm 55. One electrode 20 is inserted in each one of these annular cells at its uppermost point to vent air bubbles. At a point diametrically opposite the electrodes 20 the two cells are interconnected by a U-tube 56. The heating circuit is shown schematically in FIGURE 6 where one annular cell is designated as $C_1$ and the other annular cell is designated as $C_2$. The electrical connection between these cells through U-tube 56 is represented by a wire. Thus, the U-tube 56 provides a center tap for each cell establishing two parallel circuits through the opposite semi-circular halves of each cell with the two cells in series with each other. For a given circumference and cross section of channel 15, each current path in FIGURE 6 is twice as long as in FIGURE 1, each current path having half the cross sectional area of the current path in FIGURE 1. The electrical effect is that of two such current paths in series.

A modified form of physical construction for the parts A and B in FIGURE 4 is shown in FIGURE 5 to facilitate fabrication and assembly. In this case the part A is made of two rings 60 and 61 clamped together bolts 63. Similarly, the part B is made of two rings 64 and 65 clamped together by bolts 66 and 67. The inner and outer edges of the intermediate annular diaphragm 55 are clamped between the rings 60 and 61, and 64 and 65, as shown.

An even longer current path is established by the more elaborate arrangement shown schematically in FIGURE 7. In this case, in addition to the intermediate annular diaphragm 55 separating the channel 15 into the two cells $C_1$ and $C_2$, there are provided additional insulating diaphragms 68 to interrupt the circular continuity of each cell $C_1$ and $C_2$. The transformer secondary 22 is then connected to two electrodes $20a$ and $20b$ adjacent to one side of the diaphragm 68 in the two cells $C_1$ and $C_2$. Two more electrodes $20c$ and $20d$ communicate with the cells $C_1$ and $C_2$ on the opposite sides of the diaphragm 68 and are interconnected by a conductor 69. Thus, the FIGURE 7 arrangement provides a current path twice as long as the FIGURE 6 circuit and four times as long as the FIGURE 1 circuit, in channels of equal circumference.

In terms of total resistance the heating circuit of FIGURE 6 has four times the resistance of the FIGURE 1 circuit and the FIGURE 7 circuit has sixteen times the resistance of the FIGURE 1 circuit. The advantage of the circuit arrangements in FIGURES 6 and 7 is to increase the resistance of the current path through the fusible material so that the necessary heating effect can be obtained without requiring special equipment to produce excessively large currents at very low voltage in alignment fixtures of small size. The total volume of the fusible material is determined by mechanical considerations but this volume may be divided in various ways by insulating barriers to increase the electrical resistance of the heating circuit.

Figure 9:
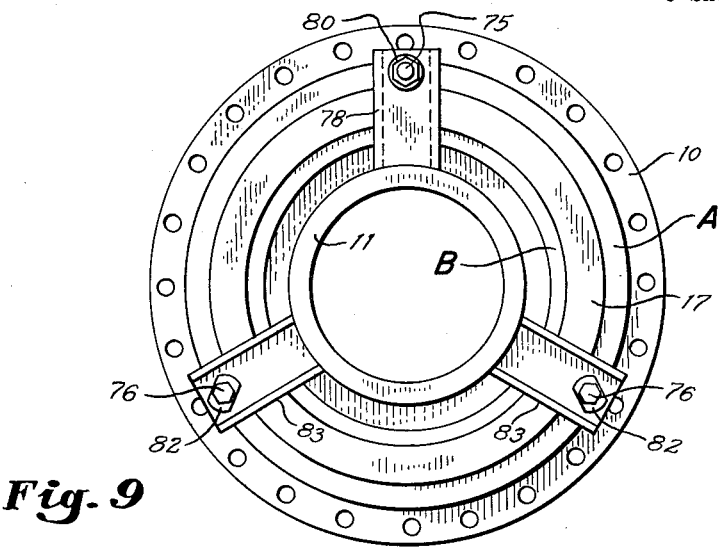
FIGURE 9 is an end view of the apparatus shown in FIGURE 8.
Figure 8:
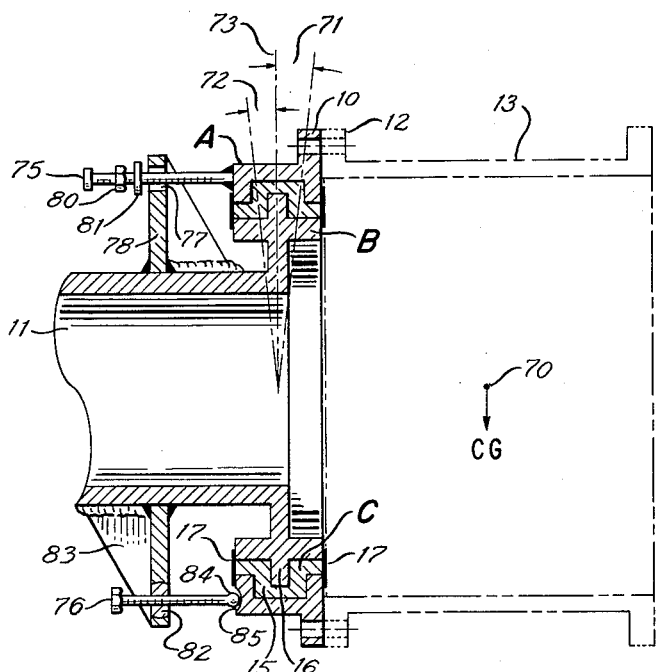
FIGURE 8 illustrates a structural modification including screw jacks.

FIGURES 8 and 9 show supplementary support means for a large overhanging load which may exceed the compressive strength of the fusible material. For example, if the parts attain an operating temperature approaching the melting point of the fusible material, its strength may be inadequate to prevent an objectionable amount of deflection or strain in the fusible material resulting in a gradual misalignment of the parts. In fact, a cold-flow problem may exist at any temperature under heavy loading.

In FIGURE 8 the movable member 11 must support the heavy member 13 in cantilever loading as described in connection with FIGURE 1. This is a side view wherein the member 13 has its center of gravity at the point 70 producing a downward moment about the joint in the alignment fixture, tending to swing the part A through a vertical angle as indicated at 71. The angle indicated at 71 is the maximum angle of rotation about the Z axis which the fixture will permit in a downward direction. Being symmetrical, the fixture also permits movement through an equal angle in an upward direction as indicated at 72, both angles being measured from the vertical plane 73.

In order to support part or all of the load member 13, the supporting member 11 is equipped with an upper screw jack 75 and a pair of lower screw jacks 76 equidistantly spaced at 120° angles around the axis of the parts as shown in FIGURE 9. The upper screw 75 passes loosely through an opening 77 in a top bracket 78 and is welded to the part A to provide a tension connection. Tension loads are sustained by a nut 80 bearing on a washer 81 against the bracket 78. The lower screws 76 are threaded through ball nuts 82 which have universal movement in the lower brackets 83. Screws 76 have ball ends 84 seated in circular depressions 85 in the part A to provide thrust abutments. Brackets 78 and 83 are welded to member 11.

In FIGURE 8 the fusible material C is melted and the flanges 10 and 12 are brought together in registry by movement of member 11 and the insertion of self-seeking and self-centering fastening means in the bolt holes of the flanges. Then the fastening means are secured and the fusible material is frozen or solidified as described in connection with FIGURE 1. With part A thus fixed in proper relation to part B, the two lower screws 76 are turned in their nuts 82 to seat their ball ends 84 firmly in the depressions 85 of part A and nut 80 is advanced on screw 75 to seat firmly against the bracket 78. These jack adjustments may be performed by a robot mechanism under remote control, the adjustments being merely of a positional nature without any lifting function. Member 13 may then be disconnected and withdrawn from its stationary support (not shown), allowing the full weight of this member to be borne by the movable member 11. The now hardened fusible material C will maintain member 13 accurately in its previous position and the screw jacks will assume a share of the load so that the fusible material will not be overstressed.

Without the screw jacks to share the load, the bearing surfaces of channel 15 and flanges 16 might have to be greatly increased thereby requiring a greater quantity of the fusible material C and excessive heating energy to melt the material. It is desirable to keep the volume of fusible material C as small as possible consistent with the clearances necessary to allow a predetermined adjustment movement. The smaller the volume of fusible material C the less heat is required to melt it quickly and the more effective is the heat sink of the surrounding parts to freeze it quickly without a special coolant. Although the screw jacks introduce an additional operation, they result in a saving in both time and energy under the severe conditions described in connection with FIGURES 8 and 9.

Figure 10:
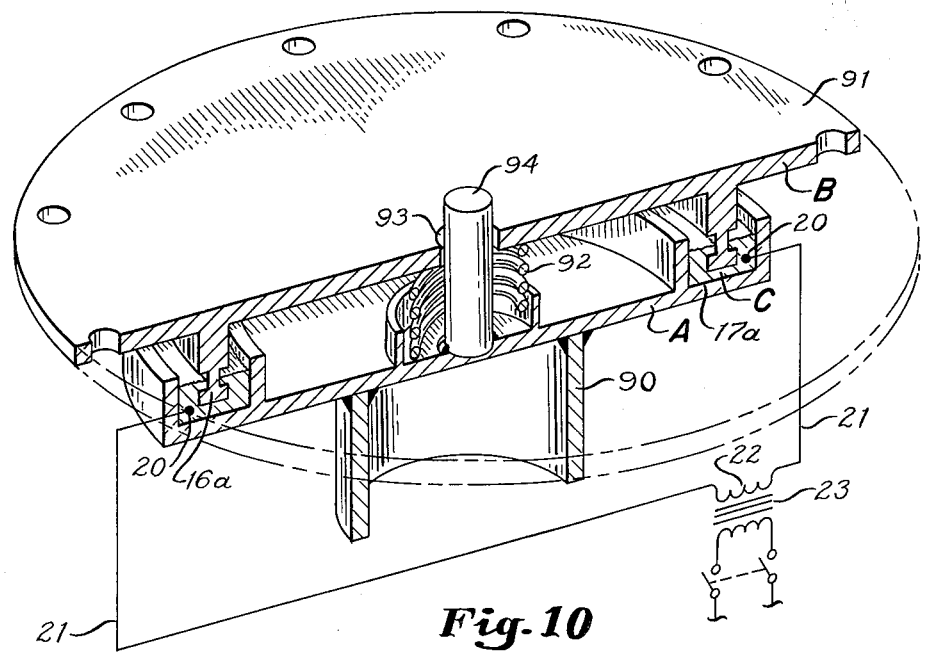
FIGURE 10 is a sectional perspective view of another modification.
Figure 11:
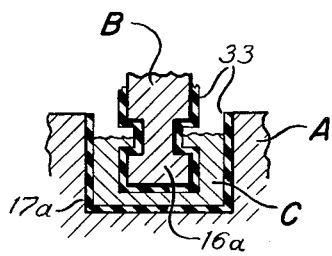
FIGURES 11, 12 and 13 are enlarged fragmentary sectional views illustrating the freedom of movement available in the device of FIGURE 10.

The containment diaphragms 17 are not always ncessary. For example, when the part A remains in horizontal position as shown in FIGURE 10, the channel 15 may be an open top channel in the form of a cup which retains the fusible material C without the necessity for any containment diaphragm. In this case the part A is supported in horizontal position on a stationary pedestal 90. The part B forms a table 91 which may have to be adjusted from time to time to keep it level or to mate with some other component of equipment. As shown by way of example, the weight of table 91 is supported by a central spring 92. The flange 16a forms an annular stabilizing foot which is maintained in approximately centered position in channel 17a by a central opening 93 in the table which receives post 94 on the part A. Opening 93 is large enough to permit rocking movements of the table 91 in all directions as well as vertical movement, rotational movement around the axis of the post and lateral movement in translation in all directions.

Thus, when fusible material C is melted, the table 91 may be adjusted with six degrees of freedom and then made rigid to its support 90 by freezing the material C. Part B may assume degree of inclination desired by appropriate modification of flange 16a for special cases. Electrodes 20 are shown schematically for passing an electric current through the fusible material to melt it but other types of heating means may be employed as previously described.

Figure 12:
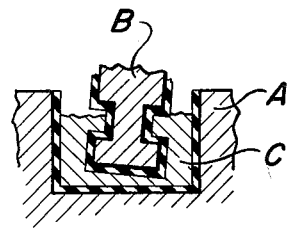
Figure 13:
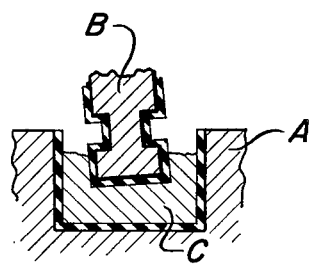

When the table is parallel with part A, the annual foot 16a will be disposed vertically and submerged uniformly around its circumference. When the table is tilted in one direction, the annular foot 16a will be tilted and one side of this foot will be submerged more deeply into the fusible material as shown in FIGURE 12. A tilt in the opposite direction will raise this part of the foot and tilt it in the opposite direction as shown in FIGURE 13.

The various illustrative examples described hereinabove employ a single alignment fixture in each case. It will be apparent however that the alignment fixtures may also be used in multiple. In FIGURE 10, for instance, if the load does not require a large bearing area on the fusible material, the single annular stabilizing foot 16a may be divided into three or four separate feet each disposed in a separate cup-like container for the fusible material. This would permit the use of smaller alignment fixtures of standardized construction which could be arranged in different ways to best serve each particular application.

The alignment fixtures need not have six degrees of freedom unless six degrees of freedom are required. In some cases certain degrees of freedom would be undesirable and then the clearance spaces between parts A and B may be shaped accordingly. Also, it may be advantageous in some cases to provide one fixture or set of fixtures for adjustment in one or more degrees of freedom and another fixture or set of fixtures for adjustment in one or more different degrees of freedom so that adjustments would not have to be made simultaneously in all degrees of freedom. In such case one or more intermediate parts would be interposed between the supporting member and the mating element to provide separate joints for the different freedom adjustments. In this way one joint could be made flexible at a time with the other joints held rigid. It is not deemed necessary, however, to illustrate such further modifications since the examples already given are believed sufficient to teach persons skilled in the art how to employ to advantage the broad principles of the invention.

Having now described my invention and in what manner the same may be used, what I claim as new and desire to protect by Letters Patent is:

1. A self-aligning cell comprising a pair of relatively movable and adjustable joint members, an electrically conductive fusible material mechanically interconnecting said joint members to support one member from the other when said material is in solid state, flexible diaphragm means interconnecting said members to confine said material to the joint formed by said members, electrodes arranged to pass a heating current through said material to fuse said material, and a flexible insulating barrier interconnecting said members to form a circuitous current path in said material of greater length than the distance between said electrodes.

2. A self-aligning fixture comprising a supporting member and an adjustable mating member supported thereby, one of said members having an annular channel and the other member having an annular flange loosely confined in said channel for relative movement, an electrically conductive fusible material in said channel interconnecting said members to furnish said support, annular flexible diaphragm means interconnecting said members to retain said material in said channel, an annular flexible insulating diaphragm interconnecting said members and dividing the body of fusible material in said channel into two conductive rings, and means for passing a heating current through said rings in series.

3. A self-aligning fixture for supporting one member in different adjusted positions on another member comprising an annular channel in one of said members containing a fusible structural supporting material which exists in a solid state at the normal operating temperature of said members, an annular flange on said other member disposed in said channel for structural connection with said fusible material to support the supported member when said material is in solid state, said flange having more than one degree of freedom of movement in said channel when said fusible material is in liquid state, means on said flange and channel interlocking said flange and channel together to prevent separation thereof, flexible diaphragm means interconnecting said two members to retain said fusible material in said channel in all positions of said members, an annular flexible insulating diaphragm interconnecting said members and dividing said fusible material into two rings, and means for passing a heating current through said rings in series, said fusible material being electrically conductive and fusible by said heating current to permit relative movement of said members.

References Cited in the file of this patent

UNITED STATES PATENTS

| | | |
|---|---|---|
| 995,537 | Hertner et al. | June 20, 1911 |
| 2,324,644 | Powell et al. | July 20, 1943 |
| 2,606,482 | Sorenson et al. | Aug. 12, 1952 |
| 2,644,605 | Palmer | July 7, 1953 |
| 2,909,752 | Mazzucchelli et al. | Oct. 20, 1959 |
| 2,992,017 | Dritz | July 11, 1961 |
| 2,992,838 | Wallace | July 18, 1961 |